J. H. IRWIN,
Assignor of one-half interest to C. B. SAWYER & J. S. DENNIS.
Lantern.
No. 8,598. Reissued Feb. 25, 1879.
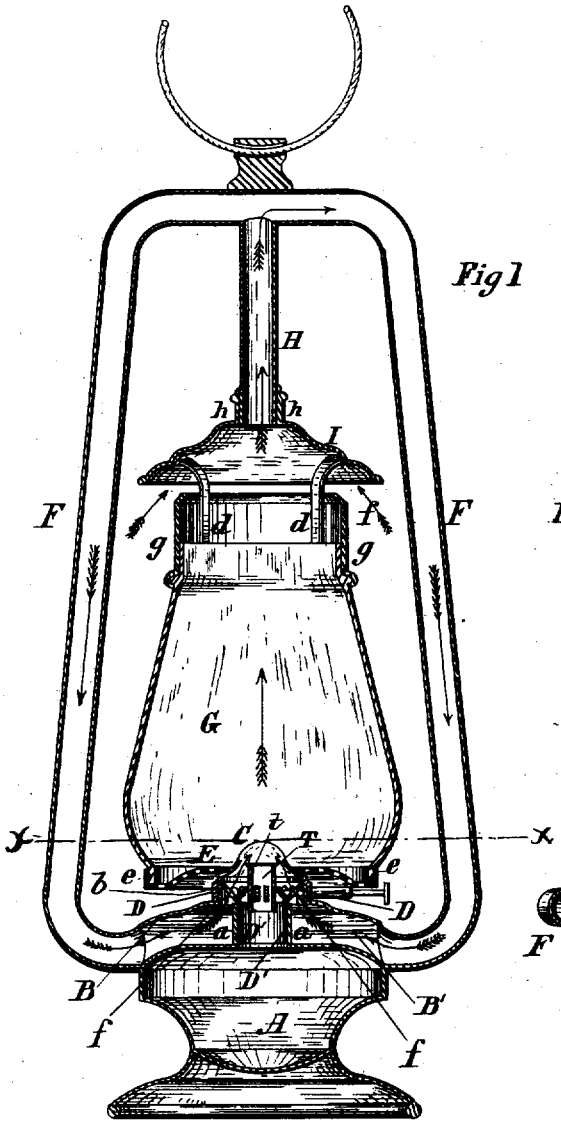
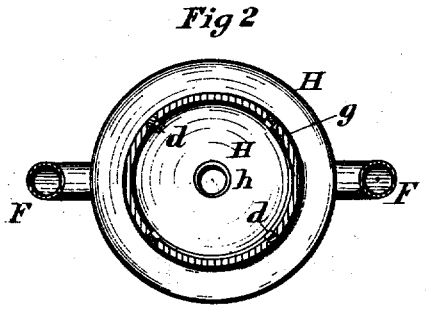
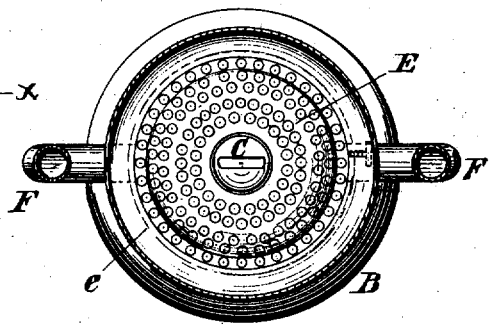
Witnesses
W. C. Corlies
Jno. C. MacGregor
INVENTOR
John H Irwin
By Coburn & Thacher
Attorneys
THE NORRIS PETERS CO., PHOTO-LITHO., WASHINGTON, D. C.

UNITED STATES PATENT OFFICE.

JOHN H. IRWIN, OF PHILADELPHIA, PENNSYLVANIA, ASSIGNOR OF ONE-HALF INTEREST TO CHARLES B. SAWYER AND JOSEPH S. DENNIS.

IMPROVEMENT IN LANTERNS.

Specification forming part of Letters Patent No. 89,770, dated May 4, 1869; Reissue No. 8,598, dated February 25, 1879; application filed January 15, 1879.

*To all whom it may concern:*

Be it known that I, JOHN H. IRWIN, of Philadelphia, State of Pennsylvania, (formerly of Chicago, in the county of Cook and State of Illinois,) have invented a new and useful Improvement in Lanterns, which is fully described in the following specification, reference being had to the accompanying drawings, in which—

Figure 1 represents a vertical central section of a lantern embodying my invention; Fig. 2, a view of the under side of the deflecting-plate arranged above the globe; and Fig. 3, a plan section taken on the line *x x*, Fig. 1.

My invention relates to a novel mode of constructing a lantern whereby the wind, instead of acting upon the flame in such a manner as to extinguish it, serves to support or sustain combustion and prevent the extinguishment of the flame.

The invention consists in the combination of fresh-air conduits supplying air to the burner with a wick-burner, deflecting cone or jacket, and a device arranged just above the top of the globe, and constructed to operate as an atmospheric injector and ejector.

It also consists in various combinations of devices, all of which will be hereinafter fully described, and more definitely pointed out in the claims.

In the drawings, A represents the oil-cup, which, in this instance, also forms the base of the lantern. There is no inclosure surrounding the same, and it is provided with a central tube, *a*, into which a removable burner is fitted, as shown.

An annular plate, B, is arranged over the oil-cup, its edges turning down and uniting with the edge of the oil-cup, forming an air-chamber, B′, said plate B being provided with a short central tube, *b*, over which an annular flange upon the burner fits, as shown in the drawings.

It will be observed that the burner is provided with two flanges, D D′, the one fitting down upon the tube *b* and the other fitting closely into the tube *a* of the oil-cup, said tubes sliding in the flanges simultaneously as the burner is secured.

A wick-tube, T, is arranged within the central flange, D′, of the burner, which communicates with the oil-pot, while perforations in the burner form a communication opening from the annular air-chamber B′ into the cone C of the burner, as clearly indicated in Fig. 1.

The cone C is slotted, and surrounds and protects the upper end of the wick-tube in the usual manner, and upon the top of said wick-tube is fixed a flange, *t*, which deflects the current of air passing into the burner, as hereinafter described, away from the root of the flame against the walls of the cone, by which the air is brought in contact with the flame at a short distance above the base of the flame, thus preventing the air-current from lifting the flame from the wick and extinguishing the light.

There is arranged upon the burner of the lantern a perforated plate or disk, E, of the same size as the bottom of the globe G, which may rest upon the same within a vertical rim, *e*, formed upon the circumference of said plate E. The perforations in this plate are of such size and number as to permit the external air to pass freely into the interior of the globe, as may be required to supply air thereto.

Upon the top of the globe there is a metallic rim, *g*, sloping inward at the top, as shown, to which rim, and consequently to the globe, arms *d* are secured, whose upper ends are fastened to a plate, I, concave on its under side and convex upon its upper side, which plate is thus held at a suitable distance above the top of the rim *g*, to allow the air and wind to pass freely in between the plate I and the top of the globe. The plate I is provided at its center with a short tube, *h*, which fits closely upon a vertical tube, H, so as to slide up and down on said tube, to raise the globe G from the plate E when desired, said flange fitting to said tube closely, or being provided with a suitable spring or catch to retain the globe at any required height, as may be desired.

At the top of the tube H two tubes, F F, are joined, which extend down, as shown, and open into the air-chamber B′ upon opposite sides of the same. Instead of two tubes, F, arranged diametrically opposite each other any other suitable even number of tubes F may be employed; but said tubes must be arranged in pairs directly opposite each other and be arranged symmetrically at equal distances from each other, so as to properly balance the air-currents, especially when the lantern is swung or oscillated. When the lantern is at rest and not blown upon by the wind, the air heated by the flame at the burner rises in the globe and passes into the tubes H and F F. These tubes present a large radiating-surface, and the heated air is thereby rapidly cooled, so that the slight upward pressure of hot air in the tube H will be sufficient to insure a downward current of cooled air through the vertical portions of the tubes F F into the air-chamber B′ and interior of the burner-cone C to supply the flame with oxygen. Fresh air, in the meantime, passing up through the perforated plate E into the globe, tends to keep the glass cool and mingles with the current from the tubes F F.

When the lantern is exposed to the wind or currents of air, the blast is distributed according to circumstances. If the air-current is moving in such a direction as to strike both the top and bottom of the lantern, a portion thereof will pass through the perforated plate E into the interior of the globe, while at the upper end of the globe, owing to the peculiar construction and arrangement of the plate I, a portion of the air-current will enter the opening between the plate and the upper end of the globe. A part of the air thus turned into the space between the plate I and top of the globe is deflected upward into the tube H, where it mingles with the air which has passed up through the globe and become heated, and passes down the tubes F to the burner to support combustion. Another part of the air thus entering at the annular opening between the plate and top of the globe will move across the upper end of the globe and escape through the same opening on the opposite side of the lantern, carrying with it the greater portion of the heated gases rising through the globe, this operation being especially true in case of high winds or strong currents of air.

It will thus be seen that under these circumstances the deflecting-plate I, arranged in connection with the globe, as described, acts both as an injector and ejector of air, and brings the force of the wind or air-current to operate on both the supply or feed current and the discharged or ejected current at the same time, and thereby tends to maintain a continuous circuit through the feed-tubes, burner, and globe in the proper direction to keep up a constant flame.

The current of air passing down through the feed-tubes to the burner will, of course, be accelerated by the above-described action of the wind; but the flange *t* upon the wick-tube prevents the force of the blast from extinguishing the flame. It will be noticed, also, that the apertures in the plate E are outside of the burner, so that air is admitted at the bottom of the globe independently and outside of the burner.

The cone C protects the upper end of the wick-tube and root of the flame from the air thus entering the globe, which would, under some circumstances, extinguish the flame.

It is evident, therefore, that the air-circuit through the lantern for supporting combustion is protected at all necessary points, and in fact is, substantially, inclosed, except where openings are necessary, and this feature of construction is essential to the successful operation of the lantern, although small apertures in the tubes or air-chamber not sufficient to affect the operation above described are immaterial.

The perforated plate E, it will be noticed, is upon the upper part of the burner, and surrounds the burner-cone, which it holds in place.

This lantern operates upon the general principle set forth in Letters Patent No. 65,230, granted to me May 28, 1867, and is an improvement on the invention described and shown in Letters Patent No. 73,012, granted to me January 7, 1868, for an improvement in lanterns.

When the lantern is constructed as above described, its operation, when moved up and down, or swung or oscillated, or exposed to winds, is much more satisfactory than in the lantern constructed as shown in the last-named patent, owing to the injecting and ejecting effect at the annular opening around the upper end of the globe, which has already been described.

It will also appear from the above description that there are three separate causes to produce a proper current through the tubes F F to the base of the flame—viz., the ascensive force of the air heated by the burner-flame and the cooling of said heated air within the tubes, the pressure of a moving current deflected toward the mouth of the tube H, and the centrifugal effect of swinging or oscillating the lantern; and it will be observed that either the second or third causes will always be cumulative with the first to produce an increased current at exactly the time when an increased supply is demanded, in consequence of atmospheric disturbances in the immediate vicinity of the lantern.

When the lantern is oscillated, the effect of centrifugal action will cause the contents of the globe to flow downward and escape through the perforated plate at the bottom of the globe, and at the same time the same cause induces an accelerated movement of the air out of the lower end of the tube or tubes, which causes the air to rush into the mouth of the tube H through the annular space at the top of the globe, thus keeping up the required supply-current to the burner.

The effect of the same devices when the lantern is suddenly raised and lowered is also such as to preserve the supply-current of air to the burner, so that the flame is sustained under all circumstances, the reversal of currents being entirely obviated.

It will also be seen that there are two currents of air produced in this lantern, to some extent independent of each other, and operating sometimes conjointly and sometimes independently. One of these air-currents is through the perforated plate E upward inside of the globe, and the other through the annular space or opening at the top of the globe, each operating in the manner above described in maintaining the continuity of the air-circuit to and from the burner.

I am aware that lanterns have been provided with tops having perforations through which air is admitted to conduits that conduct it to the burner. Examples of this construction may be seen in the patents of Coffin, April 23, 1861, Crihfield, April 2, 1867, and a prior patent granted to me May 28, 1867. In none of these patents, however, is there provided a device which operates to deflect or turn currents of air into the air-conduits; and I am not aware of any prior patent in which such a device is shown thus operating, not merely to prevent exhaustion of the feed-supply by passing air-currents, but even actually to utilize such currents by compelling them to enter the conduits and assist in keeping up the supply of air necessary to support the flame.

Movable rings may be placed upon the tubes where only two tubes are employed, or even if more tubes are used, to serve as a guard for the globe.

Having thus described my invention, what I claim as new, and desire to secure by Letters Patent, is—

1. In a lamp or lantern, the combination of the following elements, viz: a feed conduit or conduits, which supply fresh air to the burner to support combustion, a wick-burner protected by a deflecting cone or jacket, a globe or protector surmounting the burner and open at its upper end, and a device surmounting the globe constructed and arranged to operate as an atmospheric injector and ejector to inject fresh air (to the feed-conduits from the exterior atmosphere) and eject the contents of the globe from the top thereof, whereby a protected and continuous air-circuit is constantly maintained through the feed conduit or conduits, burner, and globe, substantially as described.

2. In a lamp or lantern, the combination of the following elements, viz: a globe or protector surmounting the burner and provided with openings at the bottom for the passage of air independently of the burner, a wick-burner protected by a deflecting cone or jacket, a device for injecting and ejecting air at the top of the globe, and a conduit or conduits for supplying fresh air to the burner, substantially as described.

3. The combination of the concave plate I, rim *g*, or its equivalent, tubes H and F F, and the base A B of the lantern, substantially in the manner specified and shown.

4. The combination of the globe G, concave plate I, tubes H and F, and base A B of the lantern, arranged and operating substantially as and for the purpose shown and set forth.

5. The combination of the perforated plate E, plate I, tubes H F, and the base A B of the lantern, arranged to operate as described, and for the purpose set forth.

6. The combination of the burner, the cone C, surmounting the same, and the plate E, arranged upon and around the cone or burner, whereby the burner is held in position when the globe rests on the plate, substantially as and for the purpose set forth.

7. The combination of a detachable cone surmounting the burner, the plate E, arranged upon and around the cone, and the globe G, whereby the cone is held in position by the globe resting on the plate, substantially as described.

8. In a lamp or lantern, a feed conduit or conduits constructed and arranged to receive the entire supply of fresh air for the interior of the burner and conduct it to and through the same, and adapted to balance the feed column or columns of air in oscillatory movements of the lantern, in combination with a gathering and injecting device adapted to deflect or turn currents of fresh air from the exterior atmosphere into the feed conduit or conduits, and a protector surmounting the burner to guide and protect the rising heated portion of the air-circuit, substantially as described.

JOHN H. IRWIN.

Witnesses:

CHAS. F. R. HEUCKEROTH.

LEWIS F. BETS.